(12) United States Patent
Jain et al.

(10) Patent No.: US 8,195,883 B2
(45) Date of Patent: Jun. 5, 2012

(54) RESOURCE SHARING TO REDUCE IMPLEMENTATION COSTS IN A MULTICORE PROCESSOR

(75) Inventors: Prashant Jain, San Jose, CA (US);
Yoganand Chillarige, Sunnyvale, CA (US); Sandip Das, Belmont, CA (US); Shukur Moulali Pathan, San Jose, CA (US); Srinivasan R. Iyengar, Fremont, CA (US); Sanjay Patel, San Ramon, CA (US)

(73) Assignee: Oracle America, Inc., Redwood City, CA (US)

( * ) Notice: Subject to any disclaimer, the term of this patent is extended or adjusted under 35 U.S.C. 154(b) by 320 days.

(21) Appl. No.: 12/694,877

(22) Filed: Jan. 27, 2010

(65) Prior Publication Data
US 2011/0185125 A1 Jul. 28, 2011

(51) Int. Cl.
*G06F 13/00* (2006.01)
(52) U.S. Cl. .......... 711/122; 711/118; 711/119; 712/32; 712/33; 710/100
(58) Field of Classification Search .................. None
See application file for complete search history.

(56) References Cited

U.S. PATENT DOCUMENTS 3,845,474 A * 10/1974 Lange et al. .................. 711/119
2007/0220233 A1* 9/2007 Mozak et al. .................. 712/34
* cited by examiner

*Primary Examiner* — Sanjiv Shah
*Assistant Examiner* — Daniel Tsui
(74) *Attorney, Agent, or Firm* — Meyertons, Hood, Kivlin, Kowert & Goetzel, P.C.

(57) ABSTRACT

A processor may include several processor cores, each including a respective higher-level cache; a lower-level cache including several tag units each including several controllers, where each controller corresponds to a respective cache bank configured to store data, and where the controllers are concurrently operable to access their respective cache banks; and an interconnect network configured to convey data between the cores and the lower-level cache. The controllers may share access to an interconnect egress port coupled to the interconnect network, and may generate multiple concurrent requests to convey data via the shared port, where each of the requests is destined for a corresponding core, and where a datapath width of the port is less than a combined width of the multiple requests. The given tag unit may arbitrate among the controllers for access to the shared port, such that the requests are transmitted to corresponding cores serially rather than concurrently.

20 Claims, 7 Drawing Sheets

| Fetch (F) | T0 | T3 | T6 | T2 | T7 | T5 | T1 | T4 |
|---|---|---|---|---|---|---|---|---|
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | 0 | 1 | 2 | 3 | 4 | 5 | 6 | 7 |

*FIG. 2*

RESOURCE SHARING TO REDUCE IMPLEMENTATION COSTS IN A MULTICORE PROCESSOR

BACKGROUND

1. Field of the Invention

This invention relates to processors and, more particularly, to implementation of shared resources in processors having multiple cores.

2. Description of the Related Art

To improve execution performance, processors commonly include multiple levels of caches. For example, a processor may include a fast first-level (L1) cache backed by a larger, slower second-level (L2) cache. Such an arrangement may reduce average memory access latency relative to an implementation in which the L2 cache is omitted, in that an L1 cache miss that hits in the L2 cache need not incur the full latency of an access to system memory.

The integration of multiple processor cores into a single processor (also referred to as a multicore processor) has resulted in configurations in which several independent L1 caches within the cores may share a common L2 cache. For example, in an 8-core processor, individual instruction and data caches within each of the 8 cores may share access to a larger L2 cache integrated within the processor, such that upon a cache miss, any of the L1 caches may receive data from the L2 cache.

Generally speaking, the performance of a multicore processor may increase when the number of cores and/or cache size is increased. For example, increasing the number of cores generally increases the resources available to perform concurrent operations, allowing more computational work to be done in a given amount of time. Increasing a cache's size generally decreases the cache's miss rate, which decreases average memory access latency and thus reduces the amount of time a computational task must wait for data and/or instructions to become available for use.

However, increasing the number of cores and/or cache size may substantially increase the implementation complexity of a multicore processor. For example, doubling the number of cores may double the number of wires needed to provide data to the cores from the L2 cache. Such increases in wire counts may lead to routing and floorplanning difficulties as well as increased power consumption, among other costs. Although improvements in process technology may provide some relief, the implementation costs of scaling a multicore design may quickly become nonlinear, and linear scaling techniques (such as simply scaling resources and interconnect by the same factor) may prove infeasible or impractical.

SUMMARY

Various embodiments of techniques for sharing resources to reduce the implementation costs of a multicore processor are disclosed. In some embodiments, a processor may include several hardware processor cores, each including a respective higher-level cache. The processor may also include a hardware lower-level cache including several tag units each including several controllers, where each controller corresponds to a respective one of several cache banks configured to store data, and where the controllers are concurrently operable to access their respective cache banks. The processor may further include an interconnect network configured to convey data between the processor cores and the lower-level cache.

The controllers included in a given tag unit may be configured to share access to an interconnect egress port coupled to the interconnect network, and may be further configured to generate multiple concurrent requests to convey data via the shared interconnect egress port, where each of the requests is destined for a corresponding one of the processor cores, and where a datapath width of the interconnect egress port is less than a combined width of the multiple concurrent requests.

The given tag unit may be configured to arbitrate among the controllers for access to the shared interconnect egress port, such that the multiple concurrent requests are transmitted to corresponding cores serially rather than concurrently.

BRIEF DESCRIPTION OF THE DRAWINGS

FIG. 2 is a pipeline diagram illustrating an embodiment of instruction execution in a fine-grained multithreaded processor core.

Figure 1:
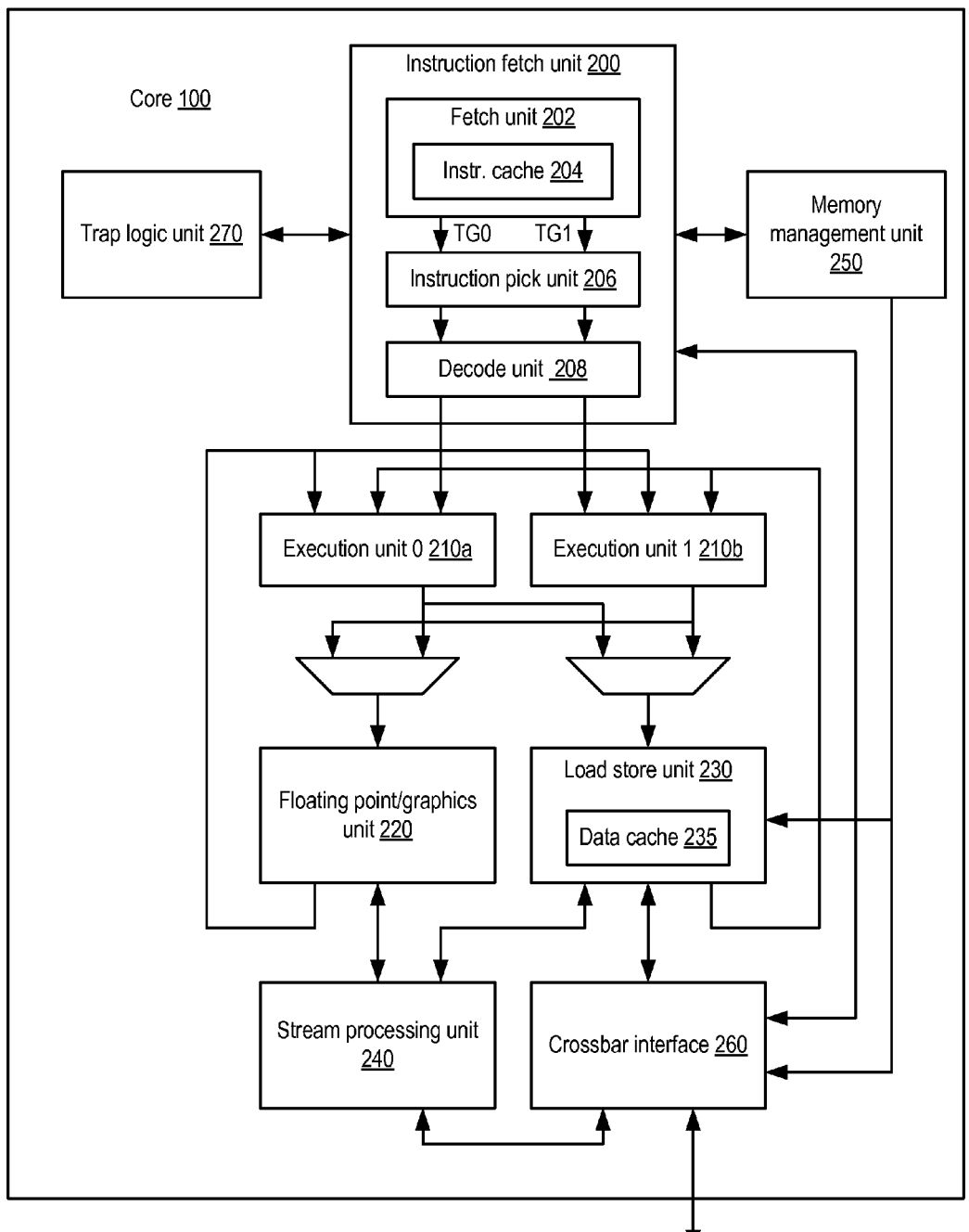
FIG. 1 is a block diagram illustrating an embodiment of a processor core configured to perform fine-grained multithreading.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

In the following discussion, embodiments of multithreaded processors that implement multiple processor cores will be considered. First, an overview of an example processor core is described, along with an example pipeline diagram illustrating possible instruction flow through a multithreaded processor core. Embodiments of processors including different numbers of cores as well as other features are then discussed. Techniques are then described for mitigating processor implementation costs as the number of cores and cache size of a multicore processor increase. Finally, an example system that might include a multithreaded, multicore processor is discussed.

Overview of Fine-Grained Multithreading Processor Core

Generally speaking, a processor core (or simply, a "core") may refer to a unit of a processor that is capable of executing instructions and processing data independently of other processor cores within the processor, such that multiple cores may execute instructions concurrently. One example of a processor core is shown in FIG. 1 as core 100.

Core 100 may be configured to execute instructions and to process data according to a particular instruction set architecture (ISA). In one embodiment, core 100 may be configured to implement the SPARC® V9 ISA, although in other embodiments it is contemplated that any desired ISA may be employed, such as x86, PowerPC® or MIPS®, for example. Additionally, as described in greater detail below, in some embodiments each instance of core 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, core 100 may be configured to concurrently execute instructions from eight threads. Thus, a processor including four, eight, or sixteen instances of core 100 may be configured to concurrently process 32, 64, or 128 threads, respectively. However, in other embodiments it is contemplated that any suitable number of cores 100 may be included within a processor, and that cores 100 may concurrently process some other number of threads.

In some embodiments, such as the one illustrated in FIG. 1, core 100 may be configured to perform fine-grained multithreading. In this type of multithreading, each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement partitioned-arithmetic and graphics-oriented instructions defined by a version of the SPARC® Visual Instruction Set (VIS™) architecture, such as VIS™ 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

Example Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 2. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 2.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Processor Configurations Including Multiple Multithreaded Cores

Figure 3:
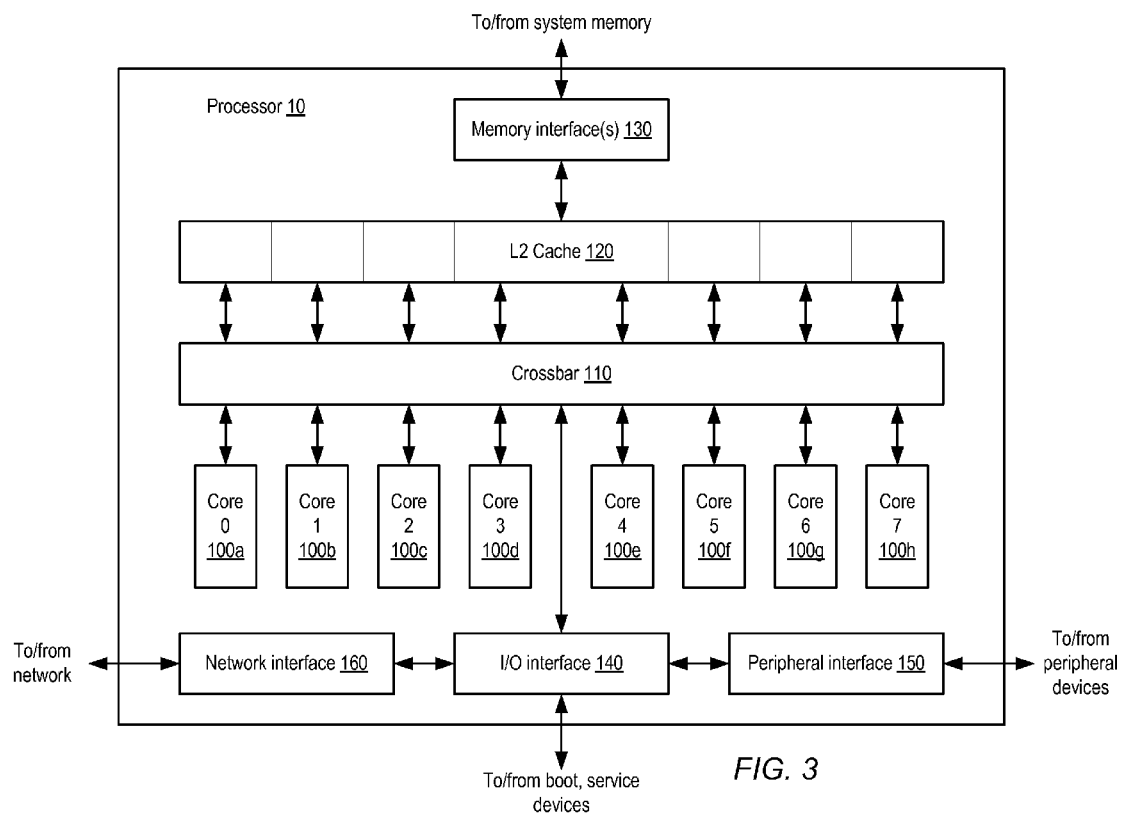
FIG. 3 is a block diagram illustrating an embodiment of a multithreaded processor.

In various embodiments, a multicore processor may include a number of instances of core 100, as well as other features. One example of an 8-core processor is shown in FIG. 3. In the illustrated embodiment, processor 10 includes eight instances of core 100 denoted cores 100*a-h* and also designated "core 0" though "core 7." Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions.

In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Figure 4:
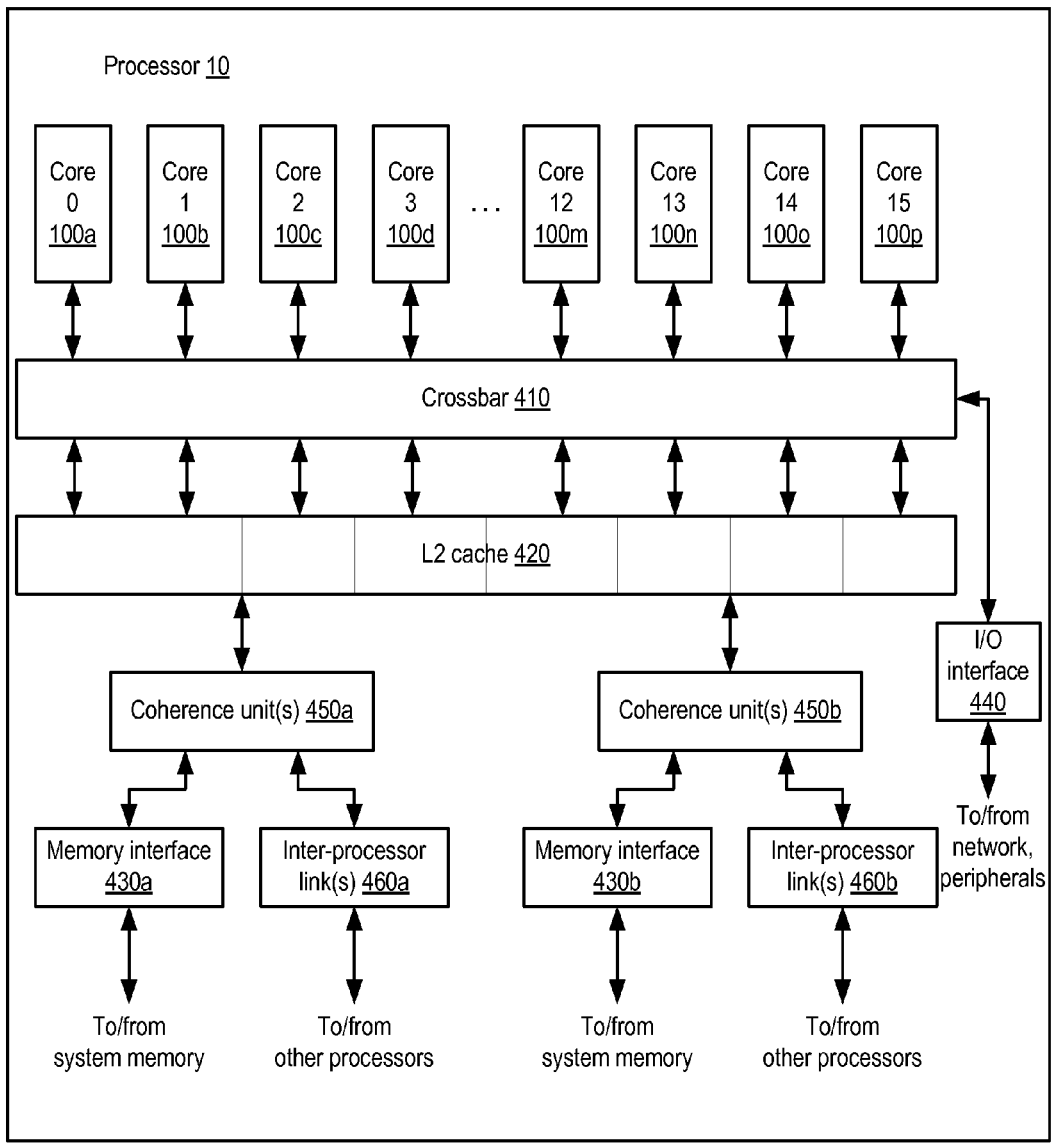
FIG. 4 is a block diagram illustrating another embodiment of a multithreaded processor.

Other possible configurations of processor 10 may include more or fewer processor cores than the version shown in FIG. 3, and may also include other or different features. FIG. 4 illustrates one such alternative embodiment. In the embodiment shown in FIG. 4, processor 10 includes 16 instances of cores 100 denoted cores 100a-p as well as "core 0" through "core 15," although for clarity, not all instances are shown in FIG. 4. Cores 100 are coupled to an L2 cache 420 as well as an I/O interface 440 through a crossbar 410. L2 cache 420 is coupled to coherence units 450a-b, which are in turn respectively coupled to memory interfaces 430a-b and inter-processor links 460a-b. It is noted that in various embodiments, the organization of FIG. 4 may represent a logical organization rather than a physical organization, and other components may also be employed. For example, in some embodiments, cores 100 and banks of L2 cache 420 may not connect directly to crossbar 410, but may instead interface with the crossbar through intermediate logic.

Like crossbar 110 discussed above, crossbar 410 may be configured to manage data flow between cores 100 and the shared L2 cache 420. In various embodiments, crossbar 410 may be implemented using any of the features or characteristics noted above with respect to crossbar 110. In particular, crossbar 410 may be configured to facilitate the exchange of data between any core 100 and any bank of L2 cache 420. It is noted that in various embodiments, crossbars 110 and 410 may be implemented using any suitable type of interconnect network, which may or may not correspond to a physical crossbar interconnect.

L2 cache 420 may be configured to cache instructions and data for use by cores 100, in a manner similar to L2 cache 120 discussed above. As the number of cores 100 is increased, the size of L2 cache 420 may also be increased in order to accommodate the additional cores 100. For example, in an embodiment including 16 cores 100, L2 cache 420 may be configured as a 6 MB cache including 16 individual cache banks of 384 KB, where each bank may be 24-way set associative with 256 sets and a 64-byte line size, although any other suitable cache size or geometry may also be employed.

As with L2 cache 110, in some embodiments, L2 cache 420 may include various queues and buffers configured to manage the flow of data to and from crossbar 410 as well as to and from coherence units 450a-b. For example, L2 cache 420 may implement a fill buffer, writeback buffer, and/or miss buffer such as described above with respect to L2 cache 110. In some embodiments, multiple banks of L2 cache 420 may share single instances of certain data structures or other features. For example, a single instance of a fill buffer may be shared by multiple banks of L2 cache 420 in order to simplify the physical implementation (e.g., routing and floorplanning) of L2 cache 420. Despite this sharing, individual banks of L2 cache 420 may be configured to concurrently and independently process accesses to data stored within the banks when such concurrency is possible.

I/O interface 440 may be configured to present cores 100 and/or L2 cache 420 with access to data from a source other than system memory Like I/O interface 140 (discussed above), I/O interface 440 may be configured to coordinate access to a network and/or peripheral interface, boot devices, or other suitable devices. Though not shown in FIG. 4, processor 10 may include network and peripheral interfaces similar to those shown in FIG. 3 and discussed above.

In some embodiments, processor 10 may be configured for use in multiprocessor systems in which multiple instances of processor 10 may share a common physical memory address space. For example, a multiprocessor system might include two, four, or some other number of processors 10. Each instance of processor 10 might be coupled to its own system memory (e.g., via memory interfaces 430a-b, as discussed below). However, each processor 10 may also be configured to access system memory that is coupled to a remote processor 10 other than itself.

Typically, in systems where more than one processor is capable of accessing the same memory address space, some type of coherence protocol may be used to ensure that the different processors present consistent memory behavior to executing software. For example, if two different processors attempted to write to the same memory address without some type of coordination, the same sequence of executing instructions that depends on data stored at that memory address might give different results on different occasions, depending upon which processor happened to be the first to write the data. A coherence protocol may require processors to coordinate with one another prior to acting on data (e.g., reading or writing to memory addresses) in order to prevent inconsistent execution behavior.

For example, a coherence protocol may define a set of states that characterize the coherence status of a unit of memory, such as a cache line. Such states may reflect the status of a unit of memory (e.g., a memory word, cache line, or coherence block) with respect to a particular processor. For example, according to the MESI coherence protocol, the coherence states may indicate to a given processor that the memory unit has been modified (M) by the given processor, is unmodified but exclusively resident (E) in the cache of the given processor, is unmodified and shared (S) by the given processor and at least one other processor (i.e., resident in multiple processors' caches), or is invalid (I) with respect to the given processor. Additionally, the coherence protocol may specify particular events that cause transitions among the various coherence states. For example, a version of the MESI protocol may require that before a processor can modify a unit of memory, it must first obtain exclusive access to that unit, which may be accomplished by invalidating any copies of that unit held by other processors. (It is noted that the MESI protocol is merely one example of a coherence protocol, and that other protocols involving additional or different states as well as state transitions are possible and contemplated.)

In various embodiments, coherence units 450a-b may be configured to implement and enforce a particular coherence protocol in order to coordinate memory accesses among multiple processors 10. For example, coherence units 450a-b may be configured to receive read or write requests that originate from L2 cache 420 (e.g., in response to cache misses), and to maintain data structures indicative of the coherence status of units of memory. In various embodiments, such data structures may include arrays of status bits that indicate the coherence status of various memory units with respect to the local processor 10, coherence directories that indicate coherence information with respect to all processors 10 within the system, or other suitable data structures. Any suitable granularity may be chosen for the unit of memory. For example, coherence units 450 may track coherence on the basis of the cache line size as defined by L2 cache 420, or may define a coherence block of some other size.

In some embodiments, individual ones of coherence units 450 may be dedicated to processing requests received from specific corresponding banks of L2 cache 420. For example, coherence units 450a-b might be configured to process even and odd banks of L2 cache 420, respectively, although any other suitable mapping of banks to coherence units may be employed, and other numbers of coherence units may be implemented. In other embodiments, any coherence unit 450 may be configured to process a request from any bank of L2 cache 420.

When coherence units 450a-b receive read or write requests, they may be configured to consult stored coherence state information and to coordinate transactions that may be necessary to complete the request. For example, depending on the coherence protocol employed, it may be necessary to invalidate another processor's copy of data before locally modifying it, or to obtain the most current copy of data from another processor if a local copy is invalid. Correspondingly, coherence units 450 may communicate with local system memory via memory interfaces 430a-b, as well as remote processors via inter-processor links 460a-b, in order to carry out transactions that accomplish data transfers and/or coherence state changes among these various entities.

Like memory interface 130 discussed above, memory interfaces 430a-b may be configured to manage the transfer of data between L2 cache 420 and system memory, via coherence units 450. Inter-processor links 460a-b may be configured to provide direct communication between instances of processor 10, e.g., for the exchange of memory data, I/O data, coherence control information, or other inter-processor communication. For example, these links may be implemented as high-speed serial point-to-point interconnects, such that each processor 10 may have one or more direct communication paths to the other processors 10. Alternative interconnect topologies such as shared buses, rings, cubes, etc. may also be employed.

Managing Implementation Costs of Resource Scaling in Multicore Processors

In some instances, the embodiment of processor 10 shown in FIG. 4 may be implemented as an extension or evolution of the version shown in FIG. 3. For example, instead of performing a clean-sheet design of most or all of the processor elements of FIG. 4, it may be a goal to reuse as much of an earlier design as possible, thus reducing the time and effort needed to complete the project. Thus, for example, the basic logical and/or physical design of core 100 as used in FIG. 3 may be reused in the processor of FIG. 4 (possibly with alterations, e.g., to account for different physical design rules, fabrication process characteristics, etc.).

Figure 5:
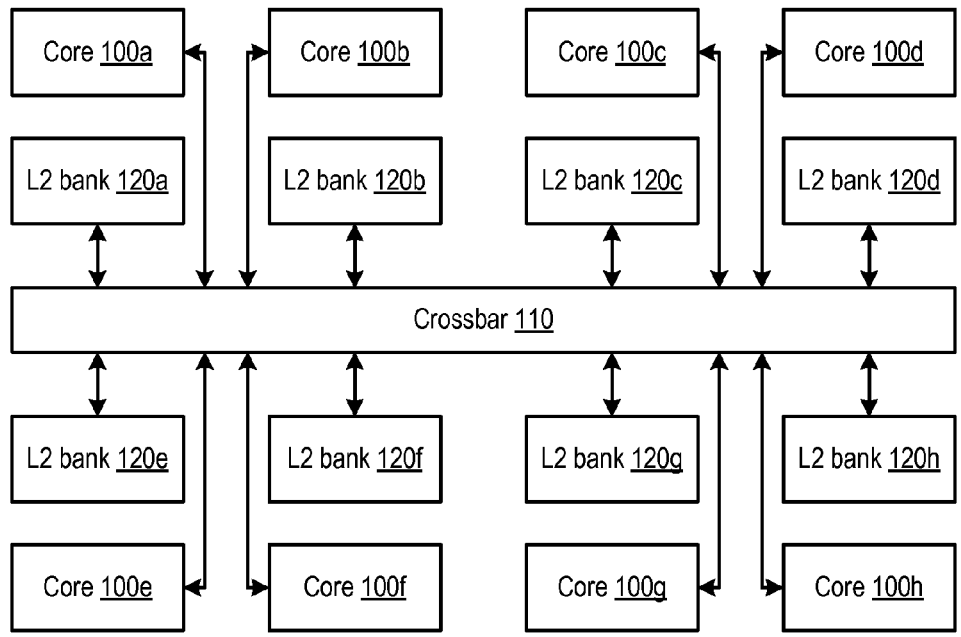
FIG. 5 is a block diagram illustrating an example of a physical arrangement of processor cores and cache banks.

However, even with design reuse, implementing the processor of FIG. 4 may be substantially more complex than simply multiplying the number of original resources by a scaling factor (e.g., 2×) and routing the result. For example, FIG. 5 illustrates an example of a floorplan showing how the cores and L2 cache banks shown in FIG. 3 might be physically arranged on a die. In the illustrated embodiment, crossbar 110 is shown interconnecting the 8 cores 100a-h and 8 L2 cache banks 120a-h of FIG. 3. As discussed above, crossbar 110 may be configured to allow any of cores 100 to access any of L2 cache banks 120, and vice versa. Crossbar 110 may also be referred to as an interconnect network, and may be implemented using any suitable connectivity topology. That is, crossbar 110 may but need not be implemented as a full crossbar configured to route any of N inputs to any of M outputs.

As shown, cores L2 cache banks 120 and cores 100 are arranged peripherally around crossbar 110. In some embodiments, crossbar 110 may be configured to implement queues or other data structures in order to facilitate data transfer between cores 100 and L2 banks 120, and vice versa. Crossbar 110 may also be configured to maintain ordering of memory operations such as store operations, for example by assigning timestamps to memory operations.

Suppose it were desired to scale the 8-core, 8-bank implementation shown in FIG. 5 to a 16-core, 16-bank implementation like that of FIG. 4. A basic or "naïve" approach to this goal might be to simply double the number of cores and banks and attempt to route the resulting crossbar configuration—in this instance, a 16×16 crossbar, where each port to the crossbar is on the order of 100 bits (depending on the size of the datapath between cores and banks).

Typically, the physical complexity of a fully-connected interconnect network (i.e., a network that supports routing of any input port to any output port) scales according to the product of the number of input and output ports. Thus, although the number of cores N and banks M to be interconnected has increased only by a linear factor of 2 (e.g., 2(N+M)), the complexity of crossbar 110 would have to increase by a factor of 4 (e.g., (2N)*(2M)=4NM) to accommodate the added cores and banks. That is, the complexity of interconnect 110 increases quadratically with N. As a result, attempting to simply scale the connectivity provided by interconnect 110 to fully accommodate an increased number of cores and banks may produce a design that is difficult to physically implement. For example, it may be difficult to route the resulting interconnect without expanding its area to an unacceptable degree.

It is noted that the example discussed here, in which an existing processor is being scaled with substantial component reuse, is not the only possible scenario involving a complex interconnect. Rather, it illustrates a particular situation in which this complexity may be encountered. As noted above, the complexity of implementing interconnect 110 is generally a function of its number of ports. This relationship may apply irrespective of whether a previous design is being scaled for reuse or a new design is being implemented for the first time.

In some embodiments, the interconnect implementation challenges presented by increased numbers of cores and cache banks may be mitigated by allowing the cores and cache banks to share certain interconnect ports and data structures. For example, it may be the case that L2 cache requests from any given core 100 are relatively sporadic (e.g., if a relatively large fraction of memory accesses hit in the L1 caches, a correspondingly small fraction of memory accesses will miss and require an L2 cache access). Moreover, for a pair of cores 100, it may be relatively unlikely that both cores 100 will need to initiate an L2 cache request at exactly the same time. For example, assuming that in any given execution cycle, two cores 100 each have an L1 cache hit rate of 95%, and further assuming that cache hit/miss behavior between the cores 100 is largely uncorrelated, then the probability of the two cores both experiencing an L1 miss necessitating an L2 cache access during the same execution cycle may be 0.25% (i.e., $P_{miss}*P_{miss}$, where $P_{miss}=1-0.95=0.05$).

In this example, given the relatively low likelihood that two cores 100 will concurrently attempt to initiate an L2 cache request, the implementation cost of providing dedicated interconnect ports to each of the two cores 100 may outweigh the performance benefit of being able to concurrently process requests from the two cores 100. Conversely, if the two cores 100 were configured to share a single interconnect port, the implementation of crossbar 110 might be considerably simplified, and the performance impact of such resource sharing may be minimal on average.

The example just discussed illustrates the concept that in instances where processor resources have relatively low utilization, such resources may be candidates for being shared in order to simplify implementation. For example, when scaling up a design, instead of increasing all resources by a particular scaling factor (e.g., a factor of 2), low-utilization resources may be increased more slowly (e.g., through sharing) than high-utilization resources.

Figure 6:
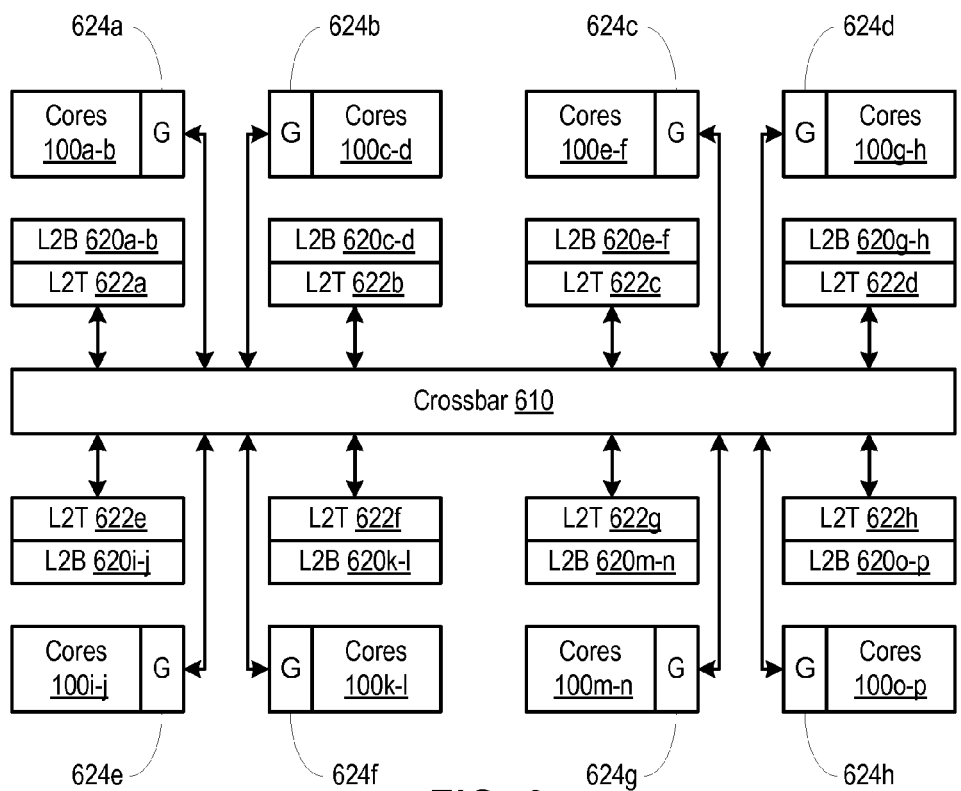
FIG. 6 is a block diagram illustrating an example of a physical arrangement of processor cores and cache banks implemented using resource sharing.

One example of how processor 10 may be implemented using resource sharing is shown in FIG. 6. In the illustrated embodiment, the 8-core, 8-bank processor shown in FIG. 5 has been scaled to include 16 cores 100a-p and 16 L2 cache banks (L2B) 620a-p. Rather than providing a dedicated interconnect port for each of the cores and cache banks, however, the illustrated embodiment of crossbar 610 provides ports for pairs of cores and cache banks. Specifically, in FIG. 6, pairs of cores 100 are configured to connect to crossbar 610 through a respective one of "gasket" units G 624a-h, while pairs of cache banks L2B 620 are configured to connect to crossbar 610 through a respective one of L2 cache tag units (L2T) 622a-h.

Although FIG. 6 illustrates sharing of interconnect ports by cores 100 and cache banks 620 on a pairwise basis, it is contemplated that in other embodiments, other types of low utilization resources may be shared, and sharing may be other than pairwise. For example, as described in detail below, low-utilization resources other than interconnect ports may be shared. Moreover, in some embodiments, a resource may be shared among three or more entities. Further, resource sharing need not be symmetric. For example, in some embodiments, cores 100 may share ports of crossbar 610 while cache banks 620 do not, or vice versa.

Generally speaking, gasket 624 may be configured to arbitrate between a pair of cores 100 to determine which core 100 will obtain access to crossbar 610 when there are multiple requests outstanding. Any suitable arbitration scheme may be used (e.g., round robin, least-recently-used, least-frequently-used, etc.). In some embodiments, gasket 624 may be configured to queue multiple outstanding requests for each of cores 100, or multiple outstanding requests from particular sources in each of cores 100. For example, in some embodiments, each of IFU 200, LSU 230, SPU 240, and MMU 250 of the embodiment of core 100 shown in FIG. 1 may be configured to generate memory requests that may be directed to the L2 cache. Correspondingly, in some embodiments, gasket 624 may be configured to implement separate queues for each of these request sources, and to arbitrate among these multiple queues for access to crossbar 610.

Once arbitration is complete, gasket 624 may be configured to forward the selected request to crossbar 610, which in turn may convey the request to the appropriate destination. In some embodiments, gasket 624 may be configured to process only outbound crossbar traffic originating from cores 100. In some such embodiments, traffic from crossbar 610 that is destined for a particular core 100 may be routed from a single port of crossbar 610 to the pair of cores 100 that share that port, along with information (e.g., a status bit or other identifier) that indicates which core the traffic is directed to. Thus, individual cores 100 may receive crossbar traffic that is not intended for them, which they may then discard. In other embodiments, different techniques may be employed for conveying crossbar traffic to cores 100.

In a manner analogous to sharing of interconnect ports among cores 100 via gasket 624, L2 tag units 622 may be configured to facilitate sharing of interconnect ports by multiple L2 banks. L2 tag units 622 may also be configured to facilitate sharing of other low-utilization resources, which may further simplify physical implementation by reducing the amount of area needed to duplicate potentially large resources as well as the need to route separate, large buses to such resources.

Figure 7:
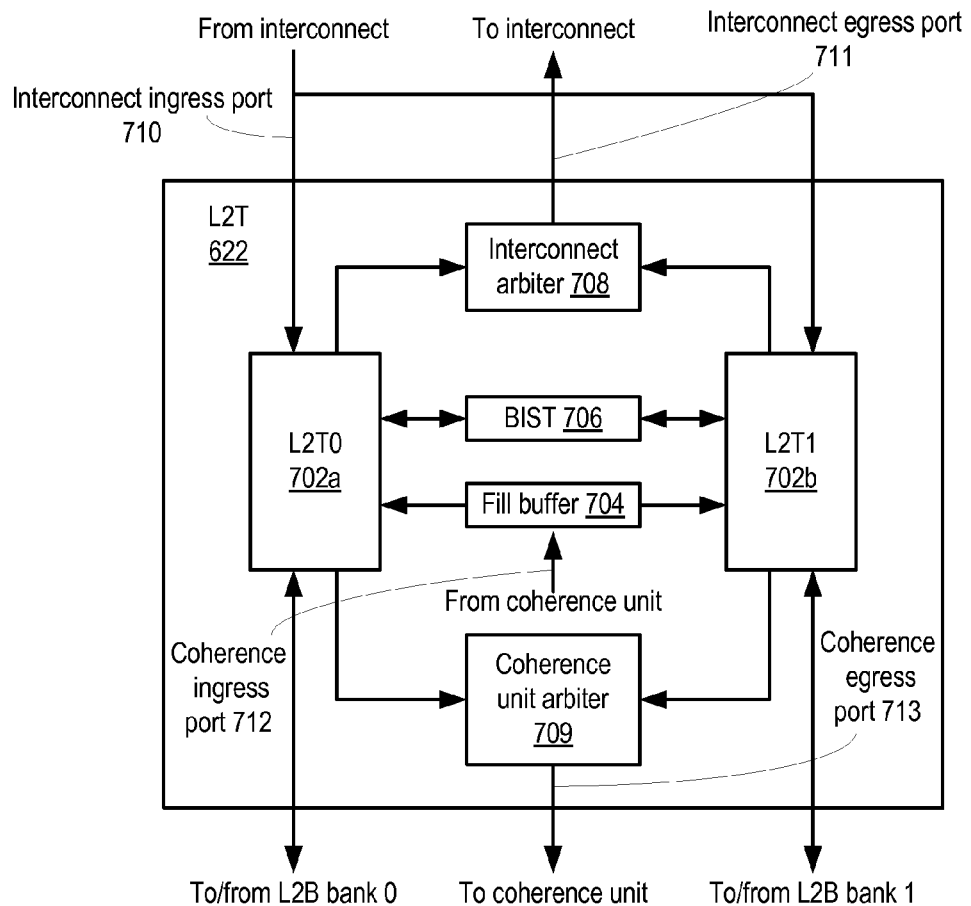
FIG. 7 is a block diagram illustrating an embodiment of an L2 cache tag unit.

One possible configuration of an L2 tag unit 622 is illustrated in FIG. 7. In the illustrated embodiment, L2 tag unit 622 includes two independent controllers (L2T0-1) 702a-b, which may also be referred to as pipes. Each of pipes 702a-b is coupled to a respective one of a pair of L2 cache banks 620 (denoted bank 0 and bank 1 in FIG. 7). Pipes 702a-b are shown coupled to a shared interconnect ingress port 710, which may in turn couple to an interconnect such as crossbar 610 of FIG. 6. Pipes 702a-b are further coupled to an interconnect arbiter 708, which in turn couples to an interconnect egress port 711, as well as a coherence unit arbiter 709, which in turn couples to a coherence unit egress port 713. These egress ports may respectively couple to an interconnect such as crossbar 610 as well as a coherence/memory interface such as one of coherence units 450 of FIG. 4. Pipes 702*a-b* are additionally coupled to a shared fill buffer 704, which is coupled to a coherence ingress port 712 that may be coupled to coherence unit 450, and to a shared built-in self-test (BIST) structure 706. Although two instances of pipes 702*a-b* are shown in FIG. 7, other embodiments of L2 tag unit 622 may include different numbers of pipes 702.

Generally speaking, each of pipes 702*a-b* may be configured to independently and concurrently process an access to its corresponding L2 cache bank. In various embodiments, pipes 702*a-b* may include a variety of elements. For example, each of pipes 702*a-b* may be configured to store the cache tags for its corresponding L2 cache bank, as well as circuitry configured to access the tags and determine whether a given cache access is a hit or miss. Each of pipes 702*a-b* may also be configured to store information indicative of the cache coherence status of the data stored within its corresponding L2 cache bank as well as elsewhere. For example, each pipe 702 may include an array of coherence status bits that indicates the coherence state (e.g., valid, shared, dirty, etc., as determined by the particular coherence protocol) of a particular corresponding unit of data, as well as a coherence directory indicating the coherence state and location of data, e.g., within the L1 caches of cores 100. To maintain coherence, pipes 702*a-b* may also be configured to process snoop requests received from coherence unit 450.

Each of pipes 702*a-b* may also be configured to implement respective instances of other elements. For example, each of pipes 702*a-b* may implement a respective miss buffer configured to temporarily store requests that miss within the L2 or require more complex processing than a simple cache access. Each of pipes 702*a-b* may also implement a respective writeback/copyback buffer configured to store evicted data and/or copyback data for snoop responses before this data is sent out of the L2 cache for further processing (e.g., by coherence unit 450). Pipes 702*a-b* may also implement other structures, such as queues configured to store incoming or outgoing requests or data pending processing, multiplexers, control logic (e.g., state machines), or any other suitable structures.

As shown in FIG. 7, both of pipes 702*a-b* may be configured to share access to a single interconnect ingress port 710. For example, as shown in FIG. 6, each instance of L2 tag unit 622 may couple to a respective port of crossbar 610. When an L2 cache request is conveyed from one of cores 100, it may include information indicating which specific one of L2 cache banks 620 the request is directed to. The request may then be routed via crossbar 610 to the appropriate instance of L2 tag unit 622. In some embodiments, the request may then be presented to both of pipes 702*a-b* via interconnect ingress port 710. Pipes 702*a-b* may then decode the bank-identifying information within the request to determine whether the request is destined for itself or for the other bank, and may either process or ignore the request depending on this information. In other embodiments, instead of connecting directly to pipes 702*a-b*, interconnect ingress port 710 may couple to another structure such as a queue, which may in turn process and direct incoming requests to the appropriate one of pipes 702*a-b*.

Additionally, both of pipes 702*a-b* may be configured to share access to a single interconnect egress port 710. For example, after a given one of pipes 702 has processed a cache request to obtain L2 data, this data may need to be conveyed to the core 100 that originally presented the request. In some embodiments, interconnect arbiter 708 may be configured to arbitrate between pipes 702 to determine which pipe 702 will be granted access to the egress port 710. For example, interconnect arbiter 708 may be configured to implement a round-robin arbitration algorithm that attempts to ensure that on average, each of pipes 702 has an equal chance of winning the arbitration. Any other suitable arbitration scheme may also be used. In some embodiments, arbitration may occur only when both pipes 702 request access to egress port 710. In various embodiments, if a pipe 702 loses arbitration, it may be required to resubmit its request for access to the shared port, or the arbiter may be configured to queue the loser's request and perform the arbitration again at the next opportunity without requiring further action by the loser.

In a similar fashion, pipes 702*a-b* may also be configured to share access to ports that connect L2 tag to one of coherence unit(s) 450. For example, as noted above, access requests that miss in the L2 cache may need to be serviced from a lower level of the memory hierarchy, such as system memory (or a lower-level cache, if there is one). Similarly, if a dirty cache line is evicted from the L2 cache, the line may need to be written back to a lower level of the memory hierarchy. In embodiments such as that of FIG. 4, cache misses and evictions may be processed by coherence unit(s) 450, which may be configured to process evictions and respond to a cache miss by accessing system memory or other processors, as appropriate.

In the illustrated embodiment, accesses to the shared coherence egress port 713 by pipes 702*a-b* are controlled by coherence unit arbiter 709. As with interconnect arbiter 708, in some embodiments, coherence unit arbiter 709 may be configured to arbitrate between pipes 702 to determine which pipe 702 will be granted access to the egress port 713. Thus, for example, in the event of an L2 miss or an eviction necessitating a writeback, the pipe 702 experiencing the miss or eviction may request access to egress port 713 in order to read or write data. As with interconnect arbiter 708 and interconnect egress port 711, depending on the outcome of arbitration and the status of pending requests, the requesting pipe 702 may either be granted immediate access to coherence egress port 713 or be instructed to wait. Coherence unit arbiter 709 may be configured to implement the same type of arbitration functionality in the same manner as interconnect arbiter 708, or may differ in its interface protocol, arbitration algorithm, or other pertinent respects.

As noted above, interconnect ingress port 710 may be shared by pipes 702*a-b*. Similarly, coherence ingress port 712 may also be shared. In the illustrated embodiment, fill data that is returned from lower-level memory may be buffered before being written into the L2 cache. For example, because the latency of obtaining fill data may be long and variable, buffering fill data may enable the completion of cache fills to be scheduled around other, possibly more critical cache activity. In the illustrated embodiment, fill buffer 704 may be configured to store fill data for one or several outstanding cache fill operations before the fill data is committed to the appropriate L2 cache bank.

It is noted that in the illustrated embodiment, not only is the datapath corresponding to coherence ingress port 712 shared between pipes 702*a-b*, but fill buffer 704 itself is also shared. That is, in some embodiments, fill buffer 704 may correspond to a low-utilization resource, and sharing of fill buffer 704 by pipes 702*a-b* may simplify the physical implementation of L2 tag unit 622 while having a minimal impact on performance. For example, fill data may be comparatively wide (on the order of 100 bits or more). Thus, in instances where fill buffer 704 is configured to store a number of entries, substantial savings in area and routing complexity may be realized by sharing fill buffer 704 rather than providing one instance per pipe 702.

Although coherence ingress port 712 is shown as being coupled only to fill buffer 704, it is contemplated that in some instances, some portions of ingress port 712 may be routed to pipes 702a-b or to other elements within L2 tag unit 622 without being routed through fill buffer 704.

Other low-utilization resources may also be shared between pipes 702a-b, which may reduce implementation costs still further. For example, in the illustrated embodiment, BIST controller 706 may be shared. Generally speaking, BIST controller 706 may be configured to coordinate testing of various L2 data structures to ascertain whether they are functional. For example, BIST controller 706 may include state machines or other logic configured to write and read test patterns to the various data arrays, registers, content-addressable memories, and/or other circuits within L2 tag unit 622 and L2 cache bank 620. When processor 10 is first powered on, or when otherwise instructed (e.g., in response to detecting one or more correctable or uncorrectable errors), BIST controller 706 may be configured to execute a number of test routines to ascertain the state of various circuit elements and to indicate whether the elements are functional.

In many instances, testing is relatively infrequent and not very performance critical. Additionally, testing may be highly symmetric, in that different instances of the same data structure (e.g., of otherwise identical data structures within pipes 702a-b) may be tested in the same fashion. Correspondingly, there may be little performance cost or implementation complexity associated with sharing of BIST controller 706 between pipes 702a-b. In some embodiments, BIST controller 706 may be configured to concurrently issue test commands to both of pipes 702a-b so that testing of their data structures may be performed in parallel. For example, where a particular data structure is replicated between pipes 702, in some embodiments, BIST controller 706 may test both instances of the particular data structure concurrently. In other embodiments, BIST controller 706 may be configured to concurrently test different types of data structures within pipes 702, or may perform tests sequentially rather than concurrently.

In some embodiments, processor 10 may support various types of direct memory access (DMA). Generally speaking, DMA may enable the bulk transfer of data into and/or out of memory without the need for significant involvement by the cores 100. For example, rather than issue discrete load and store instructions to implement a large data transfer, a core 100 may program a DMA controller with the parameters of the transfer (e.g., the amount of data to be transferred, its source, and its destination). The DMA controller may then conduct the transfer without requiring further interaction with core 100. DMA may thus reduce the overhead of communicating with peripherals such as storage devices, network interfaces, graphics subsystems, or other entities that may transfer substantial quantities of data to or from memory.

Commonly, a processor's DMA interface extends to its caches, so that DMA data may be directly stored within or read from cached data. However, providing a separate datapath for DMA may add logic and wiring complexity. Correspondingly, in the embodiment shown in FIGS. 4 and 7, DMA traffic is treated like ordinary coherent memory traffic and routed through coherence unit(s) 450, thus taking advantage of the existing coherence ingress and egress ports within L2 tag unit 622. That is, in the illustrated embodiment, DMA traffic may be largely indistinguishable from other types of memory request traffic from the cache's perspective.

As noted above, numerous opportunities may exist within a processor for sharing of low-utilization resources that may simplify physical implementation. Resource sharing may result in a reduction of the processing capacity of the shared resource. For example, if two cores are sharing a single interconnect port (e.g., a port of crossbar 610) or two pipes are sharing a data structure (e.g., fill buffer 704), then it may not be possible for the shared resource to concurrently satisfy the clients it serves. However, the performance penalty for serializing utilization of the shared resource may be outweighed by the benefits of a simplified implementation. Further, in some instances, the performance penalty may be negligible in absolute terms, irrespective of any countervailing benefits.

Figure 8:
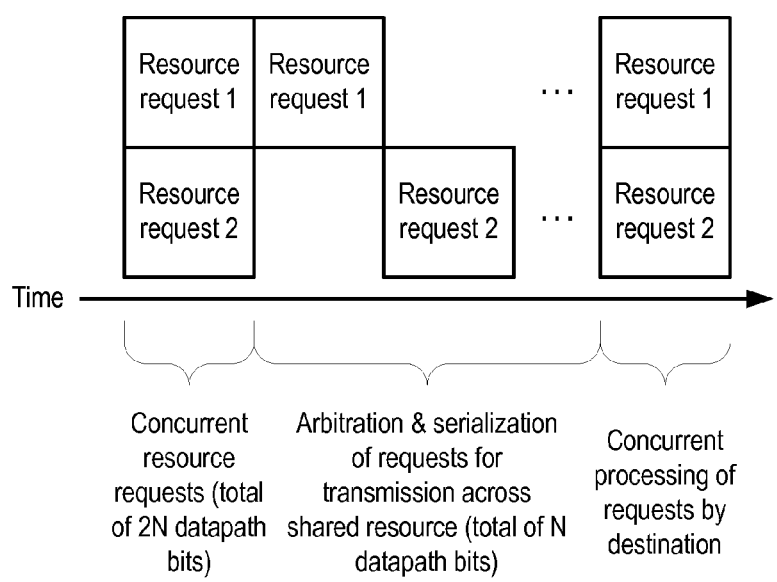
FIG. 8 illustrates a possible temporal relationship of various operations as they interact with a shared resource.
Figure 9:
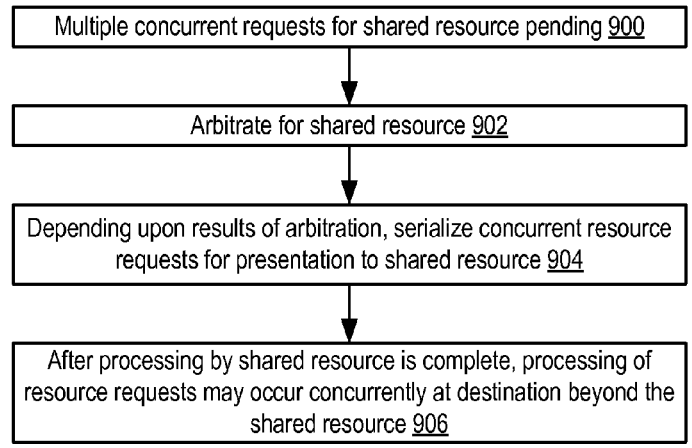
FIG. 9 is a flow diagram illustrating the operation of an embodiment of a processor that implements shared resources.

FIGS. 8-9 illustrate an example of how concurrent operations may utilize a shared resource. In particular, FIG. 8 illustrate a possible temporal relationship of various operations as they interact with the shared resource, while FIG. 9 illustrates a possible method of operation. Operation begins in block 900, where multiple concurrent resource requests for the shared resource are pending. For example, the resource requests may correspond to requests by various ones of cores 100 (or different entities within a single core, such as the IFU, LSU, SPU, and MMU as discussed above) to access L2 cache banks 620 via a shared interconnect port. The resource requests may also correspond to requests by pipes 702a-b to access shared egress ports such as interconnect egress port 711 or coherence egress port 713. The resource requests may also correspond to requests to access a shared data structure, such as fill buffer 704. In various embodiments, the multiple concurrent resource requests may be queued either externally or internally to the shared resource.

It is noted that a request to access a shared resource may be implicit in some other type of request. For example, a core 100 may explicitly generate a request that is destined for a particular L2 cache bank, or conversely, an L2 cache bank may explicitly generate a request destined for a particular core 100. In these cases, the explicit request that is generated by the core or cache may be a command packet or other data structure that encodes a particular type of operation, identifies the source and destination of the request, and/or includes other information. It may further be the case that the explicit request is to be transmitted over a shared interconnect. Thus, an explicit request to communicate with some particular destination (such as a core, a cache, a remote processor or memory, etc.) via a shared resource may be considered an implicit request to access the shared resource itself. That is, the request to access the shared resource may be "implicit" in the sense that the parties to the communication may understand the communication to be framed in terms of a source and a destination rather than in terms of a path that explicitly identifies the shared resource. Thus, the items denoted "resource request 1" and "resource request 2" in FIG. 8 may correspond to either explicit requests for resources, or to resource requests that are implicit in some other type of request as noted above.

In the illustrated embodiment, each individual resource request may occupy a total of N datapath bits. For example, requests conveyed via an interconnect such as crossbar 610 may have a defined format including a number of bits for control, address, data, or other fields. Thus, if two requests can be concurrently generated and held pending for access to the shared resource (e.g., an interconnect port), they may represent a total of 2N datapath bits. For example, each of pipes 702a-b may be configured to queue N-bit packets of data to be conveyed to cores 100, pending arbitration for shared interconnect egress port 711.

Arbitration for the shared resource may then occur (block 902). For example, as described above, gasket 624 and elements of L2 tag unit 622 may be configured to determine which of several pending requests will be granted access to the shared resource. In various embodiments, arbitration may refer to any type of scheme for making a selection of one entity from a number of entities, and may include random, pseudorandom, round-robin, or any other type of selection.

The concurrent resource requests may then be serialized for presentation to the shared resource, according to the results of arbitration (block 904). In the illustrated embodiment, depending on whether request 1 or request 2 wins arbitration, request 1 may be first presented to the shared resource, or vice versa. For example, pipes 702a-b may each have concurrent requests to transfer data to different cores 100 via shared interconnect egress port 711. Correspondingly, these concurrent requests may be conveyed one at a time in an order determined by interconnect arbiter 708. It is noted that as a result of serializing the resource requests, a datapath of only N bits is needed (as opposed to the 2N bits needed to concurrently process the resource requests, as discussed above).

Generally speaking, the serialized resource requests may be presented to the shared resource at up to the maximum rate that the shared resource can accommodate. In instances where the shared resource is pipelined, a new request may be presented to the shared resource before processing of a previous request has been completed. For example, in some embodiments, several execution cycles of latency may be needed to transmit data between cores and the L2 cache via crossbar 610. In some embodiments, crossbar 610 may be pipelined such that a new transfer request may begin while a prior transfer request is still in progress. For example, even though each transfer may require multiple cycles to complete, a new transfer may begin every cycle (or according to some other timing relationship, such as every other cycle). By contrast, in non-pipelined embodiments of a shared resource, a new resource request may not be presented until the prior request has been completed.

Once processing by the shared resource is complete, processing of the resource requests may once again occur in a concurrent fashion at a destination beyond the shared resource (block 906). For example, as noted above, embodiments of L2 tag unit 622 may include multiple pipes 702a-b that may operate concurrently. Thus, even though several L2 access requests may be serialized to access a shared interconnect port such as interconnect ingress port 710, it is possible that after they have arrived at L2 tag unit 622, they may be processed concurrently by pipes 702a-b.

It is noted that not all instances of shared resources may employ the arbitration and serialization techniques described above. Generally speaking, where a shared resource provides an output to a number of sources (as opposed to receiving an input from a number of sources), arbitration may be unnecessary. For example, a shared input port such as interconnect ingress port 710 may couple to a number of units, each of which may be configured to decode a value received from the shared port to determine whether it is destined for that particular unit.

Serialization of requests for shared resources may result in one of the requests being delayed relative to the other (e.g., as a consequence of losing arbitration). However, as shown in FIG. 8, this delay is not necessarily permanent. That is, even though resource request 1 might reach its destination before resource request 2 on account of the serialization, the processing latency of these two requests at the destination might not be identical. For example, if the resource requests are requests to access a shared interconnect ingress port to perform an L2 cache access, it is possible that request 2 might hit while request 1 might miss. Thus, even though it was delayed on account of the serialization, request 2 might catch up with or overtake request 1 during the concurrent processing of these operations at their destination.

It is noted that when low-utilization resources are shared, the performance penalty introduced by serializing requests to shared resources may not arise frequently. For example, if the L1 cache hit rate is relatively high, L2 cache accesses will occur a correspondingly small fraction of the time, and the effects of ingress/egress port sharing may likewise be relatively uncommon. Moreover, even when sharing introduces a performance penalty, this penalty may be small relative to the overall latency of the affected operation. For example, an L2 cache fill from system memory may be a very long latency event that requires dozens or hundreds of execution cycles to complete. By contrast, the performance penalty introduced by sharing fill buffer 704 may add only a small number of cycles of additional latency. Thus, the incremental performance cost of sharing a resource may be inconsequential in comparison to the performance cost of using the resource independent of the issue of sharing.

It is noted that although the discussion above occasionally refers to L1 and L2 caches, in other embodiments, the techniques described herein may apply to any combination of higher-level and lower-level caches within a memory hierarchy. Generally speaking, "higher level" may refer to a level of a memory hierarchy that is closer to a data processing unit (e.g., an instruction fetch unit or an execution unit) than is a "lower level" of the hierarchy. Put another way, higher levels of a memory hierarchy may tend to be architecturally closer to a processor, while lower levels of a memory hierarchy may tend to be architecturally closer to system memory or mass storage devices. Thus, for example, the resource-sharing techniques described herein may also be applied in an embodiment where an L2 cache is the higher-level cache and an L3 cache is the lower-level cache.

Example System Embodiment

Figure 10:
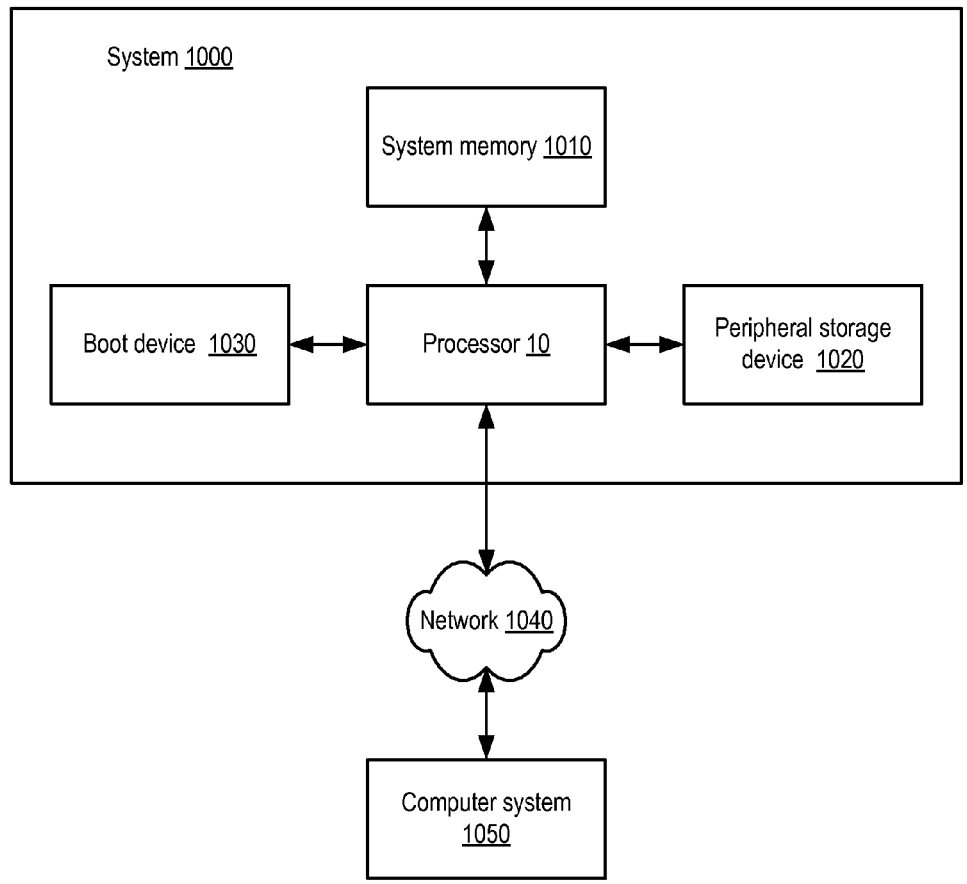
FIG. 10 is a block diagram illustrating an embodiment of a system including a multithreaded processor.

As described above, in some embodiments processor 10 as shown in FIG. 3 or 4 may be configured to interface with a number of external devices. An embodiment of a system including processor 10 is illustrated in FIG. 10. In the illustrated embodiment, system 1000 includes an instance of processor 10 coupled to a system memory 1010, a peripheral storage device 1020 and a boot device 1030. System 1000 is coupled to a network 1040, which is in turn coupled to another computer system 1050. In some embodiments, system 1000 may include more than one instance of the devices shown, such as more than one processor 10, for example. In various embodiments, system 1000 may be configured as a rack-mountable server system, a standalone system, or in any other suitable form factor. In some embodiments, system 1000 may be configured as a client system rather than a server system.

In various embodiments, system memory 1010 may comprise any suitable type of system memory as described above, such as FB-DIMM, DDR/DDR2 SDRAM, or RDRAM®, for example. System memory 1010 may include multiple discrete banks of memory controlled by discrete memory interfaces in embodiments of processor 10 configured to provide multiple memory interfaces 130. Also, in some embodiments system memory 1010 may include multiple different types of memory.

Peripheral storage device 1020, in various embodiments, may include support for magnetic, optical, or solid-state storage media such as hard drives, optical disks, nonvolatile RAM devices, etc. In some embodiments, peripheral storage device 1020 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 1030 may include a device such as an FPGA or ASIC configured to coordinate initialization and boot of processor 10, such as from a power-on reset state. Additionally, in some embodiments boot device 1030 may include a secondary computer system configured to allow access to administrative functions such as debug or test modes of processor 10.

Network 1040 may include any suitable devices, media and/or protocol for interconnecting computer systems, such as wired or wireless Ethernet, for example. In various embodiments, network 1040 may include local area networks (LANs), wide area networks (WANs), telecommunication networks, or other suitable types of networks. In some embodiments, computer system 1050 may be similar to or identical in configuration to illustrated system 1000, whereas in other embodiments, computer system 1050 may be substantially differently configured. For example, computer system 1050 may be a server system, a processor-based client system, a stateless "thin" client system, a mobile device, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
   a plurality of hardware processor cores, each comprising a respective higher-level cache;
   a hardware lower-level cache comprising a plurality of tag units each comprising a plurality of controllers, wherein each controller corresponds to a respective one of a plurality of cache banks configured to store data, and wherein the controllers are concurrently operable to access their respective cache banks;
   an interconnect network configured to convey data between the processor cores and the lower-level cache;
   wherein the controllers included in a given one of the tag units are configured to share access to an interconnect egress port coupled to the interconnect network and to generate multiple concurrent requests to convey data via the shared interconnect egress port, wherein each of the requests is destined for a corresponding one of the processor cores, and wherein a datapath width of the interconnect egress port is less than a combined width of the multiple concurrent requests;
   wherein the given tag unit is configured to arbitrate among the controllers for access to the shared interconnect egress port, such that the multiple concurrent requests are transmitted to corresponding cores serially rather than concurrently.

2. The processor as recited in claim 1, wherein the controllers included in the given tag unit are further configured to share access to an interconnect ingress port coupled to the interconnect network, and are further configured to receive requests for access to their respective cache banks from the processor cores via the shared interconnect ingress port.

3. The processor as recited in claim 1, further comprising a coherence unit configured to process read and write requests made by the lower-level cache with respect to a memory, wherein the controllers included in the given tag unit are configured to share access to a coherence egress port coupled to the coherence unit and to generate multiple concurrent read or write requests to be conveyed via the shared coherence egress port, and wherein the given tag unit is configured to arbitrate among the controllers for access to the shared coherence egress port, such that the multiple concurrent read or write requests are transmitted to the coherence unit serially rather than concurrently.

4. The processor as recited in claim 3, wherein the controllers included in the given tag unit are further configured to share access to a coherence ingress port coupled to the coherence unit, and are further configured to receive requests for access to their respective cache banks from the coherence unit via the shared coherence ingress port.

5. The processor as recited in claim 4, wherein the coherence unit is further configured to route direct memory access (DMA) traffic to and from the lower-level cache via the shared coherence ingress port and coherence egress port, respectively.

6. The processor as recited in claim 1, wherein the given tag unit further comprises a single fill buffer shared by the controllers included in the given tag unit, wherein the single fill buffer comprises one or more entries configured to store fill data received from a memory external to the lower-level cache before the fill data is written into one or more of the cache banks.

7. The processor as recited in claim 1, wherein the given tag unit further comprises a single built-in self test (BIST) controller configured to test one or more circuit elements included in the given tag unit.

8. The processor as recited in claim 7, wherein the single BIST controller is further configured to concurrently test multiple different circuit elements included within different ones of the controllers included in the given tag unit or included within different ones of the cache banks corresponding to the controllers included in the given tag unit.

9. A method, comprising:
   concurrently accessing multiple ones of a plurality of cache banks, wherein the multiple cache banks correspond to respective ones of a plurality of controllers that are included within a given one of a plurality of tag units of a hardware lower-level cache;
   generating multiple concurrent requests to convey data via an interconnect egress port shared by the controllers, wherein the shared interconnect egress port is coupled to an interconnect network, wherein each of the requests is destined for a corresponding one of a plurality of processor cores coupled to the interconnect network, wherein each of the processor cores includes a respective higher-level cache, and wherein a datapath width of the interconnect egress port is less than a combined width of the multiple concurrent requests;
   arbitrating among the controllers for access to the shared interconnect egress port; and
   dependent upon the results of said arbitrating, transmitting the multiple concurrent requests to corresponding cores serially rather than concurrently.

10. The method as recited in claim 9, further comprising receiving requests from the processor cores for access to the cache banks via an interconnect ingress port, wherein the interconnect ingress port is coupled to the interconnect network and shared by the controllers.

11. The method as recited in claim 9, further comprising:
generating multiple concurrent read or write requests to a memory external to the lower-level cache via a coherence egress port shared by the controllers, wherein the shared coherence egress port is coupled to a coherence unit;
arbitrating among the controllers for access to the shared coherence egress port; and
dependent upon the results of said arbitrating, transmitting the multiple concurrent read or write requests to the coherence unit serially rather than concurrently.

12. The method as recited in claim 11, further comprising receiving requests for access to the cache banks via a coherence ingress port, wherein the coherence ingress port is coupled to the coherence unit and shared by the controllers.

13. The method as recited in claim 9, further comprising routing direct memory access (DMA) traffic to and from the lower-level cache via the shared coherence ingress port and coherence egress port, respectively.

14. The method as recited in claim 9, further comprising storing fill data received from a memory external to the lower-level cache within a single fill buffer before the fill data is written into one or more of the cache banks, wherein the single fill buffer comprises one or more entries configured to store fill data, and wherein the single fill buffer is shared by the controllers.

15. The method as recited in claim 9, further comprising a single built-in self test (BIST) controller included within the given tag unit testing one or more circuit elements included in the given tag unit.

16. The method as recited in claim 15, further comprising the single BIST controller concurrently testing multiple different circuit elements included within different ones of the controllers included in the given tag unit or included within different ones of the cache banks corresponding to the controllers included in the given tag unit.

17. A system, comprising:
a system memory; and
a processor coupled to the system memory, wherein the processor comprises:
a plurality of hardware processor cores, each comprising a respective higher-level cache;
a hardware lower-level cache comprising a plurality of tag units each comprising a plurality of controllers, wherein each controller corresponds to a respective one of a plurality of cache banks configured to store data, and wherein the controllers are concurrently operable to access their respective cache banks;
an interconnect network configured to convey data between the processor cores and the lower-level cache;
wherein the controllers included in a given one of the tag units are configured to share access to an interconnect egress port coupled to the interconnect network and to generate multiple concurrent requests to convey data via the shared interconnect egress port, wherein each of the requests is destined for a corresponding one of the processor cores, and wherein a datapath width of the interconnect egress port is less than a combined width of the multiple concurrent requests;
wherein the given tag unit is configured to arbitrate among the controllers for access to the shared interconnect egress port, such that the multiple concurrent requests are transmitted to corresponding cores serially rather than concurrently.

18. The system as recited in claim 17, wherein the controllers included in the given tag unit are further configured to share access to an interconnect ingress port coupled to the interconnect network, and are further configured to receive requests for access to their respective cache banks from the processor cores via the shared interconnect ingress port.

19. The system as recited in claim 17, further comprising a coherence unit configured to process read and write requests made by the lower-level cache with respect to a memory, wherein the controllers included in the given tag unit are configured to share access to a coherence egress port coupled to the coherence unit and to generate multiple concurrent read or write requests to be conveyed via the shared coherence egress port, and wherein the given tag unit is configured to arbitrate among the controllers for access to the shared coherence egress port, such that the multiple concurrent read or write requests are transmitted to the coherence unit serially rather than concurrently.

20. The system as recited in claim 17, wherein the given tag unit further comprises a single fill buffer shared by the controllers included in the given tag unit, wherein the single fill buffer comprises one or more entries configured to store fill data received from a memory external to the lower-level cache before the fill data is written into one or more of the cache banks.

* * * * *